United States Patent [19]

Adams

[11] 4,016,348
[45] Apr. 5, 1977

[54] REACTOR PROCESS AND APPARATUS FOR CONTINUOUS POLYMERIZATION

[76] Inventor: George F. Adams, 2111 E. 26th St., Tulsa, Okla. 74114

[22] Filed: June 13, 1974

[21] Appl. No.: 479,173

Related U.S. Application Data

[63] Continuation of Ser. No. 228,241, Feb. 22, 1972, abandoned, which is a continuation of Ser. No. 845,753, July 29, 1969, abandoned.

[52] U.S. Cl. .................... 526/293; 23/285; 526/347
[51] Int. Cl.$^2$ .................. C08F 12/08; C08F 12/16
[58] Field of Search ........ 260/93.5 S, 95 C, 87.5 R, 260/88.2 C, 91.5; 23/285; 526/293, 347

[56] References Cited

UNITED STATES PATENTS

| | | | |
|---|---|---|---|
| 2,530,409 | 11/1950 | Stober et al. | 260/93.5 R |
| 3,451,986 | 6/1969 | Metais | 260/93.5 R |
| 3,520,661 | 7/1970 | Gröbe et al. | 260/93.5 R |
| 3,679,651 | 7/1972 | Kii et al. | 260/93.5 R |

*Primary Examiner*—Harry Wong, Jr.
*Attorney, Agent, or Firm*—Head, Johnson & Chafin

[57] ABSTRACT

A process and apparatus for continuously polymerizing styrene to a low residual monomer content in a series flow reactor, the reactor containing internal stationary devices to laterally mix the styrene as it proceeds within the reactor.

3 Claims, 2 Drawing Figures

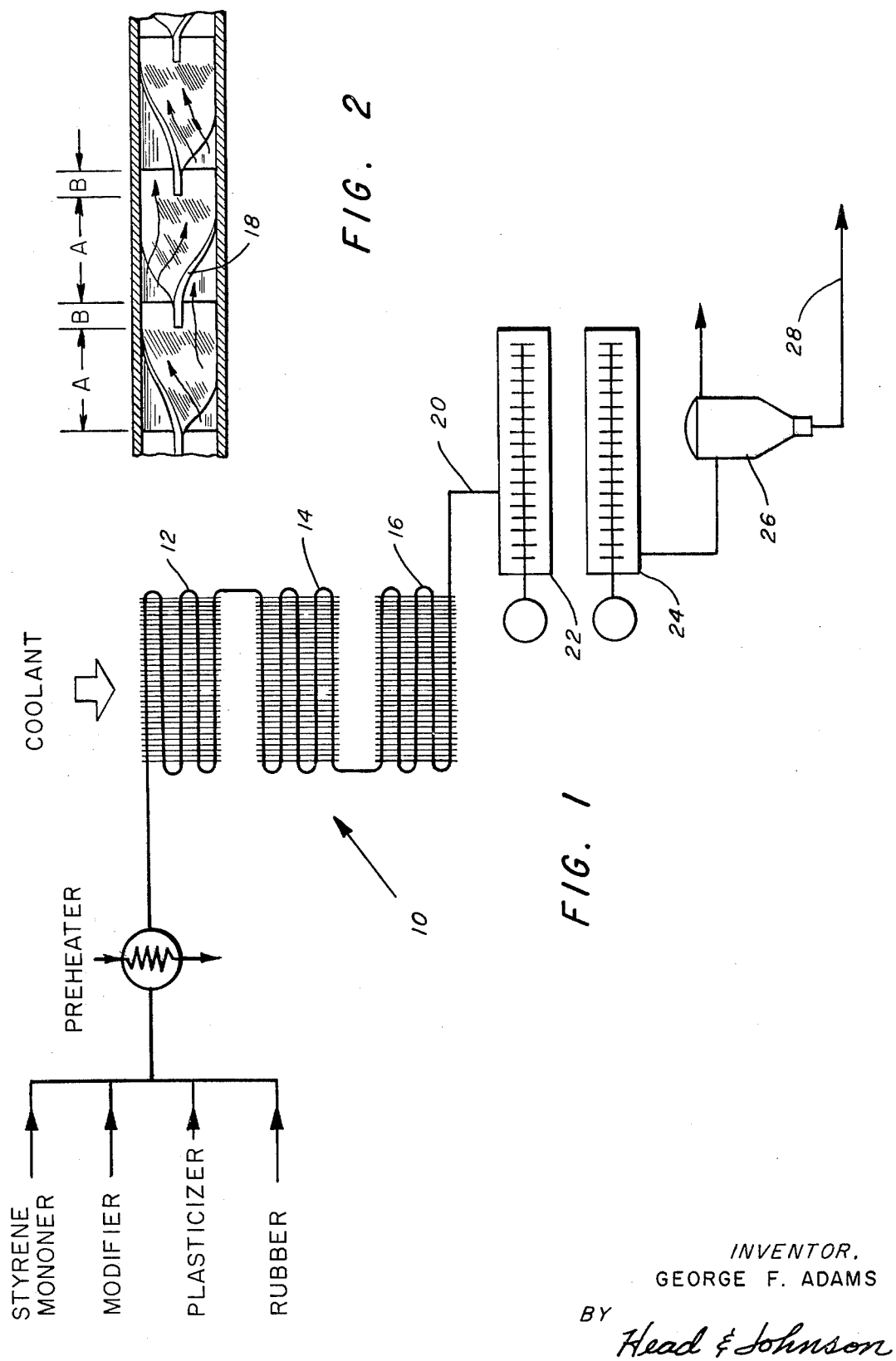

REACTOR PROCESS AND APPARATUS FOR CONTINUOUS POLYMERIZATION

BACKGROUND OF THE INVENTION

This is a continuation of copending application Ser. No. 228,241, filed Feb. 22, 1972, now abandoned, which was a continuation of Ser. No. 845,753, filed July 24, 1969, now abandoned.

It is known in the art of polymerizing monomeric materials, such as styrene, that control of the release of heat of polymerization is essential to achieve reacting conditions that will produce the desired end product. The very nature of the material makes fluid mixing and heat transfer difficult since heat is continuously evolved while the viscosity of the fluid mass is increasing. If proper control of temperature and other operating conditions are not maintained, the physical characteristics of the polymer are non-uniform and unacceptable from a sales and utility standpoint. Bulk or mass processes have been proposed as a means by which the nature of the reaction may be efficiently controlled primarily through a highly efficient agitation. Because the polymerization reaction requires from about six hours time to about twelve hours to produce a satisfactory product, the design of a continuous flow styrene polymerization process has been difficult. Others such as U.S. Pat. Nos. 3,206,287 — Crawford; 3,049,413 — Sifford; 2,530,409 — Stober, et al; 2,614,910 — Allen, et al; and 2,694,692 — Amos, et al and others, have taught varying methods of control over the polymerizing masses by various mechanical mixing and agitation devices.

SUMMARY OF THE INVENTION

This invention provides a process and apparatus for continuously polymerizing styrene wherein the cooler styrene, within a tubular series flow reactor, at the heat exchange surface, is continuously mixed with the internally hotter styrene away from the heat exchange surface solely by the diverted motion of the styrene through the tubular reactor. More particularly, this invention provides a stationary mixer within the tubular reactor providing improved mixing and heat exchange control of the polymerizing material.

The process and apparatus of this invention is particularly related to the continuous polymerization of styrene but is also applicable to polymerization of alkyl or halogen substituted styrene and mixtures thereof. It is further applicable to polymerization of other vinyl monomers alone or in mixtures with styrene or styrene derivatives and is also applicable to styrene within which are dispersed particles such as unvulcanized and unsaturated natural or synthetic rubber which is either soluble in, or can be rendered soluble in, monomeric styrene.

FIG. 1 is a schematic flow diagram, partially in cross section, depicting the series flow reactor encompassed within this invention.

FIG. 2 is a partial sectional view of a flow mixer embodiment which is an improvement over that disclosed in U.S. Pat. No. 3,286,992.

Before explaining the present invention in detail, it is to be understood that the invention is not limited in its application to the details of construction and arrangement of parts illustrated in the accompanying drawings, since the invention is capable of other embodiments and/or being practiced or carried out in various ways. Also, it is to be understood that the phraseology or terminology employed herein is for the purpose of description and not of limitation.

Referring now to the drawings, and in typical usage of this invention, monomeric styrene and those additives such as modifiers or plasticizers or rubber as desired are pumped continuously into a tubular reactor generally designated by the numeral 10. Preferably the reactor is of substantially uniform cross-section tubing about 3 to 6 inches in diameter. The reactor is provided with means to remove the heat of polymerization through the tubing wall into a desired coolant. The length of the tubular reactor is sufficient to allow for the desired reaction time when considering the flow of styrene and the internal volume of the tubing. The internal diameter of the tubing in the reactor may be varied to provide for the proper velocity of flow and rate of mixing as the reaction progresses. In some instances, several temperature zones or stages are employed over the polymerization process. That is, control of the the heat exchange coolant may vary in accordance with different stages of the reaction as at 12, 14 and 16. For example 0–30% polymerization at 250° F.; 30–60% at 300° F.; and 60–90% at 350° F. The tubular reactor is preferably of a design shown partially in cross section within which are a plurality of stationary dispersion or baffle elements 18 which are so oriented that the flow of polymer is continually diverted from the cooler outer walls to the inside where it is divided and diverted to achieve continuous mixing of that which has been cooled with the hotter styrene. The baffle elements alternately divide the flowing monomer within the reaction tubing into two essentially equal compartments of turning flow and thence into four essentially equally compartments of straight flow, whereby the flow periodically merges and separates along the length of the tubing. In some instances the entire process may occur within the tubular reactor portion allowing polystyrene of quality and molecular weight desired, to flow through the outlet 20 for further processing to a completed product.

In other instances and in an alternate embodiment of this invention the output of the tubular reactor including the stationary mixers 18 therein may conclude with a final mechanical mixing stage in one or more devices, 22 and/or 24, such as an internally agitated cylindrical reactor wherein the agitation blades are equipped for internal circulation of heating and/or cooling medium. Further processing includes a vacuum devolatilization in vessel 26 with the polymer product removed through outlet 28.

This invention is also applicable to the production of rubber modified styrene. In order to achieve the desired properties of the desired styrene product the rubber particles must be present in the styrene matrix within a certain particle size range. Otherwise, the impact strength of the styrene is greatly affected. This invention achieves the dispersion of the rubber in the styrene matrix by pumping monomeric styrene as shown in the illustration within which is dissolved rubber. The internal diversion and dividing baffles within the tubular reaction reactor agitate the styrene as it passes through the reactor during its polymerizing process and helps maintain the rubber suspended and dispersed as it tends to precipitate from the styrene.

A further understanding of this invention may be achieved by the following example:

A blend of feedstock is prepared consisting of approximately 98% styrene monomer, 2% white mineral oil, and a small amount of dodecyl mercaptan. The blended feedstock is pumped into the reactor system at a rate of approximately 1500 lbs. per hour, using a high pressure feed pump. The feed first passes through a steam heated heat exchanger in which its temperature is increased to approximately 240° F. From this exchanger the feed enters the first flow-mixed tubular exchange section. This exchanger section consists of a continuous coil of 3 inch schedule 40 pipe having a total overall length of 1,000 ft. and is cooled externally by a circulating oil bath. The pipe contains stationary internal mixing elements through its entire length except in the return bends. There elements keep the reaction mix in lateral flow agitation during the entire progress through the pipe. Residence time in the 3 inch pipe coil is approximately 2 hours, and the temperature of the reaction mixture averages approximately b 250° F. At the exit from this pipe coil, approximately 25% of the styrene monomer is converted into polystyrene. From the 3 inch pipe coil, the reaction mixture passes to a second pipe coil exchange section made of 4 inch diameter schedule 40 pipe with an overall length of approximately 1,100 ft. It is cooled externally by a circulating oil bath. This coil also contains the stationary flow mixing elements designed to keep the reaction mixture in constant lateral flow agitation. Residence time in this 4 inch diameter pipe coil is approximately 4 hours, and at the exit from this coil, the reaction mixture is approximately 50% converted into polystyrene. Temperature in this coil averages approximately 300° F. From the 4 inch diameter pipe coil, the reaction mixture passes to a 6 inch diameter pipe coil having an overall length of approximately 500 ft. It is cooled externally by a circulating oil bath. This coil is also filled with the stationary flow mixing elements, designed to keep the reaction mixture in agitation. Residence time in the 6 inch diameter pipe coil is approximately 4 hours, and the reaction mixture leaving this coil is approximately 75% converted into polystyrene. The average temperature in this reactor is approximately 350° F. From the 6 inch diameter pipe coil, the reaction mixture passes to a cylindrical reactor containing an internal mixer powered by an external power source. The blades of the mixer are equipped with means for being cooled and/or heated by a heating or cooling medium circulated through the hollow core of the mixer blades. The reaction mixture passing through the cylindrical reactor is held at a temperature of around 350° F. during a portion of the reactor and then a heating medium is used to increase the temperature to approximately 450° F. Residence time in this reactor is approximately 2 hours. The reaction mixture, at this point, is approximately 90% or more polystyrene. The reaction mixture is then discharged from the mixed reactor at approximately 450° F. into a devolatilizing vessel in which there is a vapor space held under vacuum and in which the molten polystyrene is spread into a thin film to allow for release of un-polymerized styrene and other volatiles. From the vapor space of the devolatilization vessel unreacted styrene and any other volatiles present are drawn through a condensor in which the volatile materials are condensed and discharged from the process for either recycle or reprocessing. The vacuum on the devolatilization vessel is maintained by a vacuum pump. The molten polystyrene, now substantially 100% polymer after removal of the voltatile material, is accumulated in the bottom of the devolatilization vessel from which it is pumped with a gear pump designed for pumping high viscosity materials through an extrusion dye in which it is formed into continuous strands. The strands are cooled in a water bath and chopped into pellets.

"Essentially vinyl monomer" as used herein is defined as not only the named ingredients alone but in mixture with other materials such as plasticizers, modifiers, diluents or reaction additives to vary or change the characteristics of the vinyl polymer or to reduce viscosity of the polymerizing reactants.

Improved mixing of fluids is accomplished with the apparatus of FIG. 2 and is not limited to polymerization reactions but includes all mixing or intermixing of fluids. Internally of the flow tubing an essentially integral longitudinal member defines sequential and alternate sections A and B. Section A divides the basically unidirectional flow into two essentially equal compartments which turn the flow because of the curved sheet-like portion 18. Section B, which may be equal to, less than, or longer than A, comprises intersecting straight members which divides the flow into essentially four compartments which preferably are of equal flow area. It is found that a construction according to this mixing device provides improved mixing, improved heat exchange if desired, and strength of the integral internal device which must withstand the forces of fluid flow.

What is claimed is:

1. A continuous process of polymerizing a composition consisting essentially of vinyl monomers selected from the group consisting of styrene, alkyl substituted styrene, halogen substituted styrene, and mixtures thereof comprising the steps of:
   continuously flowing said monomer through reaction tubing of substantially uniform cross-section in essentially one direction;
   alternately dividing said flowing monomer, within said reaction tubing, into two essentially equal compartments of turning flow and thence into four essentially equal compartments of straight flow, whereby said flow periodically merges and separates along the length of said tubing to create, across a given lateral cross-section of monomer, a substantially uniform temperature maintained solely by external cooling of said reaction tubing, and to create a uniform rate of flow across said tubing until polymerized to a desired condition; and
   controllably maintaining the desired temperature of said external cooling.

2. Process of claim 1 including:
   dividing said reaction tubing into a plurality of polymerization stages; and
   controllably maintaining the temperature of said polymerization by heat exchange means externally of each stage.

3. The process of claim 1 including the additional steps of:
   flowing partially polymerized monomer from said reaction tubing into at least one cylindrical reactor;
   internally mixing said monomer in said cylindrical reactor by externally powered mechanical agitation until polymerization to a desired condition;
   controllably maintaining the temperature of said polymerization in said cylindrical reactor; and
   removing polymer from said cylindrical reactor.

* * * * *